(12) United States Patent
Jo

(10) Patent No.: US 9,759,893 B2
(45) Date of Patent: Sep. 12, 2017

(54) OPTICAL DEVICE AND MOBILE DEVICE INCLUDING A PLURALITY OF OPTICAL DEVICES HAVING DIFFERENT FIELDS OF VIEW

(71) Applicant: SAMSUNG ELECTRO-MECHANICS CO., LTD., Suwon-si (KR)

(72) Inventor: Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 15/046,859

(22) Filed: Feb. 18, 2016

(65) Prior Publication Data

US 2017/0023769 A1   Jan. 26, 2017

(30) Foreign Application Priority Data

Jul. 24, 2015  (KR) .......................... 10-2015-0105230

(51) Int. Cl.
   *G02B 13/00*   (2006.01)
   *G02B 9/62*   (2006.01)
   (Continued)

(52) U.S. Cl.
   CPC .......... *G02B 13/0045* (2013.01); *G02B 9/62* (2013.01); *G02B 13/04* (2013.01); *H04N 5/2258* (2013.01); *H04M 1/0264* (2013.01)

(58) Field of Classification Search
   CPC .................................................. G02B 13/0045
   See application file for complete search history.

(56) References Cited

U.S. PATENT DOCUMENTS 9,581,789 B2* 2/2017 Liao .................... G02B 13/0045
2010/0328471 A1* 12/2010 Boland et al. ........ G02B 13/004
                                              348/207.99

(Continued)

FOREIGN PATENT DOCUMENTS

JP   2011-85733 A    4/2011
KR   10-0962970 B1   6/2010
(Continued)

OTHER PUBLICATIONS

Korean Office Action issued on Oct. 20, 2016 in counterpart Korean Application No. 10-2015-0105230. (17 pages in Korean with English translation).

*Primary Examiner* — Roberto Velez
*Assistant Examiner* — Cynthia Segura
(74) *Attorney, Agent, or Firm* — NSIP Law

(57) ABSTRACT

An optical device and mobile device including a plurality of optical devices having different fields of view to increase an aberration improvement effect and to realize a higher degree of resolution are disclosed. The optical device includes first to sixth lenses disposed sequentially from an object, and an image sensor configured to convert an image of a subject incident through the first to sixth lenses into an electrical signal, wherein 0.7<TTL/f<1.0. The mobile device includes a plurality of optical systems having different fields of view, wherein a difference between fields of the two optical devices of the plurality of optical devices is 20 degrees or more, and one optical device of the plurality of optical devices comprise, whereby a wide angle function and a telephoto function may be realized.

17 Claims, 13 Drawing Sheets

(51) Int. Cl.
  *G02B 13/04* (2006.01)
  *H04N 5/225* (2006.01)
  *H04M 1/02* (2006.01)

(56) References Cited

U.S. PATENT DOCUMENTS

| | | | | |
|---|---|---|---|---|
| 2011/0164327 A1* | 7/2011 | Sato | G02B 13/004 | 359/714 |
| 2012/0194726 A1* | 8/2012 | Huang | G02B 13/0045 | 348/340 |
| 2012/0257287 A1* | 10/2012 | Huang | G02B 9/60 | 359/714 |
| 2012/0314302 A1* | 12/2012 | Tang | G02B 13/22 | 359/714 |
| 2013/0003169 A1* | 1/2013 | Lee | G02B 13/004 | 359/357 |
| 2013/0265650 A1* | 10/2013 | Chen | G02B 13/008 | 359/714 |
| 2013/0314799 A1* | 11/2013 | Kuo | G02B 15/177 | 359/680 |
| 2014/0078603 A1 | 3/2014 | You | | |
| 2014/0153114 A1* | 6/2014 | Suzuki | G02B 13/0045 | 359/714 |
| 2014/0198393 A1* | 7/2014 | Sugita | G02B 15/177 | 359/680 |
| 2014/0204480 A1* | 7/2014 | Jo | G02B 13/0045 | 359/764 |
| 2015/0109684 A1 | 4/2015 | Son | | |
| 2015/0253543 A1* | 9/2015 | Mercado | G02B 13/002 | 348/370 |
| 2015/0253647 A1* | 9/2015 | Mercado | G02B 13/002 | 348/373 |
| 2015/0268446 A1* | 9/2015 | Chen | G02B 9/62 | 348/148 |
| 2015/0277083 A1* | 10/2015 | Chae | G02B 9/64 | 359/708 |
| 2015/0301315 A1* | 10/2015 | Chen | G02B 13/0045 | 359/713 |
| 2015/0362703 A1* | 12/2015 | Park | G02B 13/0045 | 359/713 |
| 2016/0004035 A1* | 1/2016 | Jeong | G02B 9/62 | 359/757 |
| 2016/0048006 A1* | 2/2016 | Jo | G02B 13/0045 | 359/714 |
| 2016/0054543 A1* | 2/2016 | Nabeta | G02B 13/0045 | 359/713 |
| 2016/0091694 A1* | 3/2016 | Tang | G02B 13/002 | 359/713 |
| 2016/0116707 A1* | 4/2016 | Chen | G02B 13/004 | 359/740 |
| 2016/0116708 A1* | 4/2016 | Chen | G02B 9/34 | 348/335 |
| 2016/0119510 A1* | 4/2016 | Chen | G02B 13/0045 | 348/373 |
| 2016/0124186 A1* | 5/2016 | Tang | G02B 13/0045 | 359/713 |
| 2016/0131899 A1* | 5/2016 | Jo | G02B 5/005 | 348/294 |
| 2016/0154211 A1* | 6/2016 | Jo | G02B 13/0045 | 359/713 |
| 2016/0187620 A1* | 6/2016 | Huang | G02B 13/0045 | 348/335 |
| 2016/0187622 A1* | 6/2016 | Huang | G02B 13/0045 | 348/335 |
| 2016/0238820 A1* | 8/2016 | Tsai | G02B 13/0045 | |
| 2016/0238821 A1* | 8/2016 | Liao | G02B 9/60 | |
| 2016/0252709 A1* | 9/2016 | Lin | G02B 13/0045 | 348/335 |
| 2016/0282586 A1* | 9/2016 | Hsu | G02B 13/0045 | |
| 2017/0017064 A1* | 1/2017 | Jo | G02B 9/62 | |
| 2017/0023769 A1* | 1/2017 | Jo | G02B 13/0045 | |
| 2017/0045718 A1* | 2/2017 | Park | G02B 13/0045 | |
| 2017/0108665 A1* | 4/2017 | Huang | G02B 13/0045 | |
| 2017/0115471 A1* | 4/2017 | Shinohara | G02B 13/0045 | |
| 2017/0146775 A1* | 5/2017 | Jung | G02B 13/0045 | |

FOREIGN PATENT DOCUMENTS

| | | |
|---|---|---|
| KR | 10-0962999 B1 | 6/2010 |
| KR | 10-2014-0035829 A | 3/2014 |
| KR | 10-1452084 B1 | 10/2014 |
| KR | 10-1504035 B1 | 3/2015 |

* cited by examiner

| Surface | Radius | Thickness | Index | Abbe |
|---|---|---|---|---|
| Object | Infinity | Infinity | | |
| 1 | 2.23843 | 1.081174 | 1.544 | 55 |
| 2 | 4.68101 | 0.1 | | |
| 3 | 3.51092 | 0.337875 | 1.544 | 55 |
| 4 | -10.1006 | 0.1 | | |
| Stop | Infinity | 0.1 | | |
| 5 | 10.40865 | 0.3 | 1.629 | 23 |
| 6 | 1.97732 | 1.015798 | | |
| 7 | -10.6221 | 0.3 | 1.629 | 23 |
| 8 | -5.75845 | 0.679905 | | |
| 9 | -4.14082 | 0.635465 | 1.629 | 23 |
| 10 | -5.00838 | 0.108758 | | |
| 11 | 12.31293 | 0.690848 | 1.544 | 55 |
| 12 | 3.10305 | 0.304025 | | |
| 13 | Infinity | 0.3 | | |
| 14 | Infinity | 0.107856 | | |
| Image | Infinity | 0.719471 | | |

FIG. 3

| surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | -0.463383 | -0.436203 | 1.310553 | 0 | 53.474149 | -5.675604 | -209.7157 | 0 | -105.6981 | 6.544913 | -2876.444 | -47.3529 |
| 4th Order Coefficient (A) | -0.002559 | -0.037732 | -0.022224 | 0.0138524 | -0.072116 | 0.0079508 | -0.028071 | 0.0273977 | 0.0091974 | 0.0520194 | -0.2364 | -0.131578 |
| 6th Order Coefficient (B) | -3.28E-05 | 0.0159861 | -0.005449 | -0.046625 | 0.0135071 | 0.0963565 | -0.100594 | -0.140902 | -0.00871 | -0.149734 | 0.0772618 | 0.0748307 |
| 8th Order Coefficient (C) | -0.001227 | -0.039993 | -0.045311 | 0.0544561 | 0.236288 | -0.155311 | 0.167428 | 0.168846 | 0.0493829 | 0.164428 | 0.068048 | -0.027878 |
| 10th Order Coefficient (D) | 0.0002351 | 0.0956933 | 0.143517 | -0.020157 | -0.53132 | 0.477731 | -0.113323 | -0.093862 | -0.019818 | -0.121168 | -0.111803 | 0.0067275 |
| 12th Order Coefficient (E) | 0.000378 | -0.089297 | -0.140346 | -0.012476 | 0.603998 | -0.800131 | 0.0445431 | 0.0285799 | 0.0350716 | 0.0548646 | 0.0648741 | -0.001008 |
| 14th Order Coefficient (F) | -0.000264 | 0.0376388 | 0.0565613 | 0.0083685 | -0.3675594 | 0.680102 | -0.008306 | -0.004683 | -0.00063 | -0.013336 | -0.017586 | 8.33E-05 |
| 16th Order Coefficient (G) | 5.476E-05 | -0.006619 | -0.007432 | -0.000521 | 0.0939427 | -0.223456 | 0 | 0.0002337 | 0 | 0.00133 | 0.0018434 | -2.86E-06 |
| 18th Order Coefficient (H) | 0 | 0 | 0 | 0 | 0 | 0 | 0 | 0 | 0 | 0 | 0 | 0 |

FIG. 4

| Surface | Radius | Thickness | Index | Abbe |
|---|---|---|---|---|
| Object | Infinity | Infinity | | |
| 1 | 2.24822 | 1.131306 | 1.544 | 55 |
| 2 | 4.78518 | 0.100006 | | |
| 3 | 3.62498 | 0.354463 | 1.544 | 55 |
| 4 | -9.54132 | 0.1 | | |
| Stop | Infinity | 0.1 | | |
| 5 | 10.38202 | 0.3 | 1.629 | 23 |
| 6 | 1.95889 | 1.028591 | | |
| 7 | -10.5886 | 0.3 | 1.629 | 23 |
| 8 | -6.17775 | 0.679737 | | |
| 9 | -4.35807 | 0.615723 | 1.629 | 23 |
| 10 | -5.0062 | 0.106498 | | |
| 11 | 18.81988 | 0.623166 | 1.544 | 55 |
| 12 | 3.23525 | 0.304025 | | |
| 13 | Infinity | 0.300001 | | |
| 14 | Infinity | 0.107856 | | |
| Image | Infinity | 0.779935 | | |

FIG. 7

| surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | -0.460702 | -0.489573 | 1.322352 | 0 | 53.474148 | -5.659757 | -209.7157 | 0 | -105.6981 | 6.548015 | -2096.593 | -47.4276 |
| 4th Order Coefficient (A) | -0.002376 | -0.037222 | -0.019744 | 0.0137296 | -0.071334 | -0.00132 | -0.028088 | 0.0271228 | 0.0093634 | 0.0519727 | -0.2336789 | -0.127097 |
| 6th Order Coefficient (B) | -0.002484 | 0.0112474 | -0.02389 | -0.04492 | 0.0132473 | 0.177504 | -0.10091 | -0.139716 | -0.069249 | -0.149782 | 0.0773901 | 0.0728949 |
| 8th Order Coefficient (C) | -0.000629 | -0.022585 | 0.0120467 | 0.05214457 | 0.2306676 | -0.460754 | 0.167878 | 0.167752 | 0.0498739 | 0.1644881 | 0.0681326 | -0.027526 |
| 10th Order Coefficient (D) | -5.14E-05 | 0.0626962 | 0.04487003 | -0.014383 | -0.5133669 | 1.132202 | -0.113691 | -0.093459 | -0.020048 | -0.121201 | -0.11199 | 0.0067068 |
| 12th Order Coefficient (E) | 0.0003751 | -0.054456 | -0.053681 | -0.021883 | 0.5759724 | -1.596693 | 0.0407456 | 0.0285919 | 0.0051569 | 0.0548767 | 0.0650012 | -0.001004 |
| 14th Order Coefficient (F) | -0.000223 | 0.0197021 | 0.0156296 | 0.0162622 | -0.343912 | 1.18416 | -0.005357 | -0.004759 | -0.000644 | -0.013341 | -0.0176224 | 8.23E-05 |
| 16th Order Coefficient (G) | 4.508E-05 | -0.001768 | 0.0003076 | -0.003162 | 0.0852783 | -0.3556 | 0 | 0.00025771 | 0 | 0.0013309 | 0.0018477 | -2.79E-06 |
| 18th Order Coefficient (H) | 0 | 0 | 0 | 0 | 0 | 0 | 0 | 0 | 0 | 0 | 0 | 0 |

FIG. 8

| Surface | Radius | Thickness | Index | Abbe |
|---|---|---|---|---|
| Object | Infinity | Infinity | | |
| 1 | 2.21114 | 0.844352 | 1.544 | 55 |
| 2 | 4.263 | 0.151517 | | |
| 3 | 3.38466 | 0.34831 | 1.544 | 55 |
| 4 | -9.80315 | 0.1 | | |
| Stop | Infinity | 0.1 | | |
| 5 | 9.7217 | 0.3 | 1.629 | 23 |
| 6 | 2.049 | 0.958649 | | |
| 7 | -9.52091 | 0.324096 | 1.629 | 23 |
| 8 | -5.35099 | 0.623071 | | |
| 9 | -4.38993 | 0.769496 | 1.629 | 23 |
| 10 | -4.82579 | 0.1 | | |
| 11 | 11.28788 | 0.686323 | 1.544 | 55 |
| 12 | 2.79426 | 0.304025 | | |
| 13 | Infinity | 0.3 | | |
| 14 | Infinity | 0.107856 | | |
| Image | Infinity | 0.826657 | | |

| surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | -0.499691 | -0.296622 | 1.280311 | 0 | 53.474149 | -6.074527 | -209.7157 | 0 | -105.6981 | 5.243701 | -869.9153 | -29.96726 |
| 4th Order Coefficient (A) | -3.93E-03 | -3.50E-02 | -2.57E-02 | 1.01E-02 | -6.35E-02 | 1.58E-02 | -3.93E-02 | 2.93E-02 | -4.85E-03 | 4.28E-02 | -2.10E-01 | -1.20E-01 |
| 6th Order Coefficient (B) | 8.47E-04 | 1.97E-02 | 9.77E-03 | -2.11E-02 | 5.22E-02 | 6.15E-02 | -8.35E-02 | -1.49E-01 | -1.89E-02 | -1.12E-01 | 4.20E-02 | 5.19E-02 |
| 8th Order Coefficient (C) | -5.06E-03 | -5.80E-02 | -7.87E-02 | -3.08E-02 | -3.92E-02 | -9.54E-02 | 1.32E-01 | 1.64E-01 | -3.95E-02 | 1.16E-01 | 6.89E-02 | -1.06E-02 |
| 10th Order Coefficient (D) | 4.82E-03 | 1.23E-01 | 1.84E-01 | 1.38E-01 | 1.58E-01 | 3.13E-01 | -7.93E-02 | -8.12E-02 | 5.47E-02 | -7.75E-02 | -6.67E-02 | -7.05E-05 |
| 12th Order Coefficient (E) | -2.26E-03 | -1.12E-01 | -1.66E-01 | -1.71E-01 | -2.97E-01 | -4.90E-01 | 3.11E-02 | 2.49E-02 | -2.29E-02 | 3.18E-02 | 2.48E-02 | 3.89E-04 |
| 14th Order Coefficient (F) | 4.63E-04 | 4.87E-02 | 6.28E-02 | 8.99E-02 | 2.43E-01 | 2.79E-01 | -7.23E-03 | -5.00E-03 | 3.24E-03 | -6.74E-03 | -3.83E-03 | -6.01E-05 |
| 16th Order Coefficient (G) | -9.09E-06 | -7.85E-03 | -7.32E-03 | -1.74E-02 | -7.49E-02 | -1.14E-01 | 0 | 1.03E-04 | 0 | 5.52E-04 | 1.44E-04 | 2.95E-06 |
| 18th Order Coefficient (H) | 0 | 0 | 0 | 0 | 0 | 0 | 0 | 0 | 0 | 0 | 0 | 0 |

OPTICAL DEVICE AND MOBILE DEVICE INCLUDING A PLURALITY OF OPTICAL DEVICES HAVING DIFFERENT FIELDS OF VIEW

CROSS-REFERENCE TO RELATED APPLICATION(S)

This application claims the priority and benefit under 35 USC §119(a) of Korean Patent Application No. 10-2015-0105230, filed on Jul. 24, 2015 with the Korean Intellectual Property Office, the entire disclosure of which is incorporated herein by reference for all purposes.

BACKGROUND

1. Field

The following description relates to an optical system and a mobile device including a plurality of optical systems having different fields of view.

2. Description of Related Art

Mobile communications terminals often come with camera modules, enabling image capturing and video calling. As functionality of cameras in such mobile communications terminals have increased, cameras for use in mobile communications terminals need to have higher levels of resolution and performance.

Since there is a trend to miniaturize and lighten mobile communications terminals, there are limitations in realizing camera modules having high levels of resolution and high degrees of performance.

In order to solve such issues, camera lenses have been formed of plastic, a material lighter than glass, and lens modules have been configured of five or more lenses to realize high levels of resolution.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an optical system in which an aberration improvement effect is increased, and a high degree of resolution is realized.

In another general aspect, there is provided a mobile device capable of realizing a wide angle function and a telephoto function by including a plurality of optical systems having different fields of view.

In another general aspect, there is provided an optical device including first to sixth lenses disposed sequentially from an object, and an image sensor configured to convert an image of a subject incident through the first to sixth lenses into an electrical signal, wherein $0.7<TTL/f<1.0$, where TTL is a distance from an object-side surface of the first lens to an imaging plane of the image sensor, and f is an overall focal length of the optical device including the first to sixth lenses.

The optical device may satisfy $1.1<TTL/(ImgH*2)$, where ImgH is half of a diagonal length of the imaging plane of the image sensor.

The optical device may satisfy $15°<FOV<35$, where FOV is a field of view of the optical device.

The optical device may satisfy $0.16<r1/f<2$, where $r1$ is a radius of curvature of the object-side surface of the first lens.

The optical device may satisfy $v4<30$, where $v4$ is an Abbe number of the fourth lens is $v4$.

The optical device may satisfy $v1-v3>30$, where $v1$ is an Abbe number of the first lens, and $v3$ is an Abbe number of the third lens.

The optical device may include a stop disposed between the second lens and the third lens.

The optical device may satisfy $f/SD \leq 2.8$, where SD is a diameter of the stop.

An image-side surface of the first lens may be concave.

An image-side surface of the third lens may be concave.

An image-side surface of the sixth lens may be concave.

At least one of an object-side surface and an image-side surface of the sixth lens may nave at least one inflection point.

At least one of an object-side surface and an image-side surface of each of the first to sixth lenses may be aspherical.

An image-side surface and an object-side surface of the second lens may be convex.

An image-side surface and an object-side surface of the fourth lens may be concave.

In another general aspect, there is provided a mobile device including a plurality of optical devices having different fields of view, wherein a difference between fields of view of the two optical devices of the plurality of optical devices is 20 degrees or more, and one optical device of the plurality of optical devices include first to sixth lenses disposed sequentially from an object, and an image sensor configured to convert an image of a subject incident through the first to sixth lenses into an electrical signal, wherein $0.7<TTL/f<1.0$, where TTL is a distance from an object-side surface of the first lens to an imaging plane of the image sensor, and f is an overall focal length of the optical device including the first to sixth lenses.

The plurality of optical devices may include a first optical device and a second optical device, and $15°<FOV1<35$, where FOV1 is a field of view of the first optical device.

The mobile device may satisfy $20° \leq |FOV1-FOV2| \leq 60°$, where FOV2 is a field of view of the second optical device.

BRIEF DESCRIPTION OF DRAWINGS

FIG. 3 is a diagram illustrating an example of a table representing characteristics of lenses in the optical system illustrated in FIG. 1.

FIG. 4 is a diagram illustrating an example of a table illustrating respective aspherical coefficients of lenses in the optical system illustrated in FIG. 1.

FIG. 7 is a diagram illustrating an example of a table representing respective characteristics of lenses in the optical system illustrated in FIG. 5.

FIG. 8 is a diagram illustrating an example of a table illustrating respective aspherical coefficients of lenses illustrated in FIG. 5.

FIG. 11 is a diagram illustrating an example of a table representing respective characteristics of lenses in the optical system illustrated in FIG. 9.

FIG. 12 is a diagram illustrating an example of a table illustrating respective aspherical coefficients of lenses in the optical system illustrated in FIG. 9.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
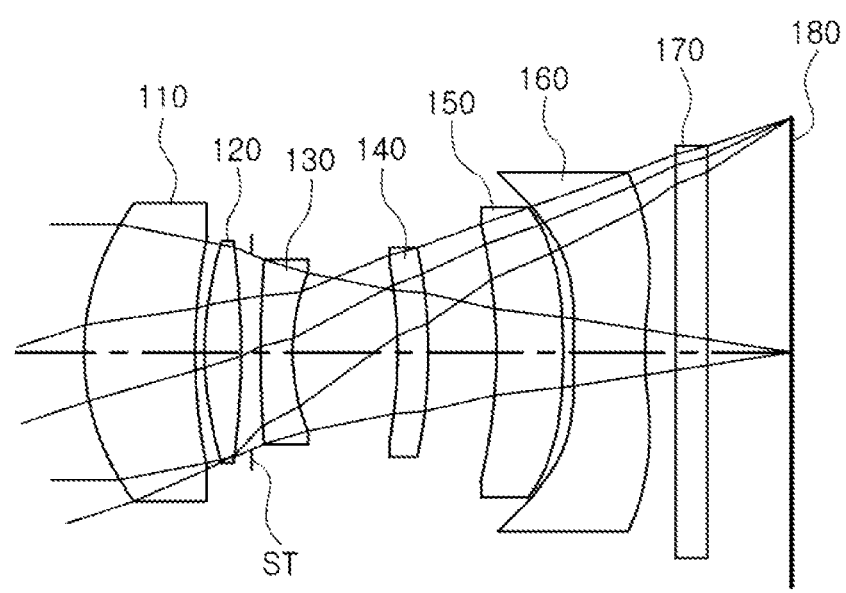
FIG. 1 is a diagram illustrating an example of an optical device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In the drawings, the thicknesses, sizes, and shapes of lenses may be exaggerated for convenience of explanation. The shapes of spherical surfaces or aspherical surfaces illustrated in the drawings are illustrated by way of example, i.e., the shapes of the spherical surfaces or the aspherical surfaces are not limited to those illustrated in the drawings.

A first lens refers to a lens closest to an object, while a sixth lens refers to a lens closest to an image sensor. A first surface of each lens refers to a surface of the lens closest to an object side (or an object-side surface) and a second surface of each lens refers to a surface of the lens closest to an image side (or an image-side surface). All numerical values of radii of curvature, thicknesses, and the like, of lenses are indicated by millimeters (mm) unless otherwise indicated.

Further, a paraxial region refers to a narrow region in the vicinity of an optical axis.

According to an example, an optical device may include six lenses, i.e., the optical device may include a first lens, a second lens, a third lens, a fourth lens, a fifth lens, and a sixth lens.

However, the optical device is not limited to only six lenses, but may further include other components and lenses, if desired. For example, the optical device may include a stop controlling an amount of light. In addition, the optical device may further include an infrared cut-off filter filtering infrared light. Further, the optical device may further include an image sensor converting an image of a subject incident on the image sensor into an electrical signal. Further, the optical device may further include a gap maintaining member to adjust a gap between lenses.

In the optical device, the first to sixth lenses may be formed of plastic.

In addition, at least one of the first to sixth lenses may have an aspherical surface. Each of the first to sixth lenses may have at least one aspherical surface.

At least one of first and second surfaces of the first to sixth lenses may be aspherical. The aspherical surfaces of the first to sixth lenses may be represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots \quad \text{[Equation 1]}$$

Here, c is a curvature (an inverse of a radius of curvature) at an apex of the lens, K is a conic constant, and Y is a distance from a certain point on the aspherical surface of the lens to an optical axis in a direction perpendicular to the optical axis. In addition, constants A to F are aspherical coefficients, Z is a distance between the certain point on the aspherical surface at the distance Y and a tangential plane meeting the apex of the aspherical surface of the lens.

In an example, the optical device including the first to sixth lenses may have the first lens having positive refractive power, the second lens having positive refractive power, the third lens having negative refractive power, the fourth lens having positive refractive power, the fifth lens having negative refractive power, and the sixth lens having negative refractive power sequentially from the object side.

The optical device configured as described above may improve optical performance through aberration improvement.

The optical device may satisfy Conditional Expression 1.

$0.7<TTL/f<1.0$      [Conditional Expression 1]

TTL is a distance from an object-side surface of the first lens to an imaging plane of the image sensor, and f is an overall focal length of the optical device.

The optical device may satisfy Conditional Expression 2.

$1.1<TTL/(ImgH*2)$      [Conditional Expression 2]

ImgH is half of a diagonal length of the imaging plane of the image sensor.

The optical device may satisfy Conditional Expression 3.

$15°<FOV<35°$      [Conditional Expression 3]

Here, FOV is a field of view of the optical device. The field of view of the optical device is indicated by degrees.

The optical device may satisfy Conditional Expression 4.

$0.16<r1/f<2$      [Conditional Expression 4]

Here, r1 is a radius of curvature of the object-side surface of the first lens, and f is the overall focal length of the optical device.

The optical device may satisfy Conditional Expression 5.

$v4<30$      [Conditional Expression 5]

Here, $v4$ is an Abbe number of the fourth lens.

The optical device may satisfy Conditional Expression 6.

$v1-v3>30$      [Conditional Expression 6]

Here, ν1 is an Abbe number of the first lens, and ν3 is an Abbe number of the third lens.

The optical device may satisfy Conditional Expression 7.

$$f/SD \leq 2.8 \quad \text{[Conditional Expression 7]}$$

Here, SD is a diameter of the stop, and f is the overall focal length of the optical device.

The first to sixth lenses configuring the optical device will be described below.

The first lens may have positive refractive power. In addition, the first lens may have a meniscus shape of which an object-side surface is convex. A first surface of the first lens may be convex in the paraxial region, and a second surface of the first lens may be concave in the paraxial region.

At least one of the first and second surfaces of the first lens may be aspherical. In an example, both surfaces of the first lens may be aspherical.

The second lens may have positive refractive power. In addition, both surfaces of the second lens may be convex. First and second surfaces of the second lens may be convex in the paraxial region.

At least one of the first and second surfaces of the second lens may be aspherical. In an example, both surfaces of the second lens may be aspherical.

The third lens may have negative refractive power. In addition, the third lens may have a meniscus shape of which an object-side surface is convex. A first surface of the third lens may be convex in the paraxial region, and a second surface of the third lens may be concave in the paraxial region.

At least one of the first and second surfaces of the third lens may be aspherical. In an example, both surfaces of the third lens may be aspherical.

The fourth lens may have positive refractive power. In addition, the fourth lens may have a meniscus shape of which an image-side surface is convex. A first surface of the fourth lens may be concave in the paraxial region, and a second surface of the fourth lens may be convex in the paraxial region.

At least one of the first and second surfaces of the fourth lens may be aspherical. For example, both surfaces of the fourth lens may be aspherical.

The fifth lens may have negative refractive power. In addition, the fifth lens may have a meniscus shape of which an image-side surface is convex. A first surface of the fifth lens may be concave in the paraxial region, and a second surface of the fifth lens may be convex in the paraxial region.

At least one of the first and second surfaces of the fifth lens may be aspherical. For example, both surfaces of the fifth lens may be aspherical.

The sixth lens may have negative refractive power. In addition, the sixth lens may have a meniscus shape of which an object-side surface is convex. A first surface of the sixth lens may be convex in the paraxial region, and a second surface of the sixth lens may be concave in the paraxial region.

At least one of the first and second surfaces of the sixth lens may be aspherical. For example, both surfaces of the sixth lens may be aspherical.

In addition, the sixth lens may have at least one inflection point formed on at least one of the first and second surfaces of the sixth lens. For example, the first surface of the sixth lens may be convex in the paraxial region and become concave at an edge of the sixth lens. In addition, the second surface of the sixth lens may be concave in the paraxial region and become convex at an edge of the sixth lens.

In the optical device configured as described above, a plurality of lenses perform an aberration correction function, whereby aberration improvement performance may be increased.

An example of an optical device will be described with reference to FIGS. 1 through 4.

The optical device according to the first example may include a first lens 110, a second lens 120, a third lens 130, a fourth lens 140, a fifth lens 150, and a sixth lens 160. The optical device may further include a stop ST, an infrared cut-off filter 170, and an image sensor 180.

As illustrated in Table 1, a focal length (f1) of the first lens 110 may be 6.79 mm, a focal length (f2) of the second lens 120 may be 4.81 mm, a focal length (f3) of the third lens 130 may be -3.83 mm, a focal length (f4) of the fourth lens 140 may be 19 mm, a focal length (f5) of the fifth lens 150 may be -51.93 mm, a focal length (f6) of the sixth lens 160 may be -7.93 mm, and an overall focal length (f) of the optical device may be 7.2 mm.

TABLE 1

| | |
|---|---|
| f | 7.2 |
| f1 | 6.79 |
| f2 | 4.81 |
| f3 | -3.83 |
| f4 | 19 |
| f5 | -51.93 |
| f6 | -7.93 |
| FNO | 2.8 |
| TTL | 5.8 |
| FOV | 17 |
| r1/f | 0.310893 |

The characteristics (radii of curvature, thicknesses, refractive indices, and Abbe numbers) of the six lenses are illustrated in FIG. 3.

In the first example, the first lens 110 may have positive refractive power, and may have a meniscus shape of which an object-side surface is convex. For example, a first surface of the first lens 110 may be convex in the paraxial region, and a second surface of the first lens 110 may be concave in the paraxial region.

The second lens 120 may have positive refractive power, and both surfaces of the second lens 120 may be convex. For example, first and second surfaces of the second lens 120 may be convex in the paraxial region.

The third lens 130 may have negative refractive power, and may have a meniscus shape of which an object-side surface is convex. For example, a first surface of the third lens 130 may be convex in the paraxial region, and a second surface of the third lens 130 may be concave in the paraxial region.

The fourth lens 140 may have positive refractive power, and may have a meniscus shape of which an image-side surface is convex. For example, a first surface of the fourth lens 140 may be concave in the paraxial region, and a second surface of the fourth lens 140 may be convex in the paraxial region.

The fifth lens 150 may have negative refractive power, and may have a meniscus shape of which an image-side surface is convex. For example, a first surface of the fifth lens 150 may be concave in the paraxial region, and a second surface of the fifth lens 150 may be convex in the paraxial region.

The sixth lens 160 may have negative refractive power, and may have a meniscus shape of which an object-side surface is convex. For example, a first surface of the sixth lens 160 may be convex in the paraxial region, and a second surface of the sixth lens 160 may be concave in the paraxial region.

In addition, the sixth lens 160 may have at least one inflection point formed on at least one of the first and second surfaces of the sixth lens 160.

The respective surfaces of the first to sixth lenses 110 to 160 may have aspherical coefficients as illustrated in FIG. 4. The stop ST may be disposed between the second lens 120 and the third lens 130. The optical device configured as described above may have aberration characteristics illustrated in FIG. 2.

An optical device according to another example will be described with reference to FIGS. 5 through 8.

Figure 2:
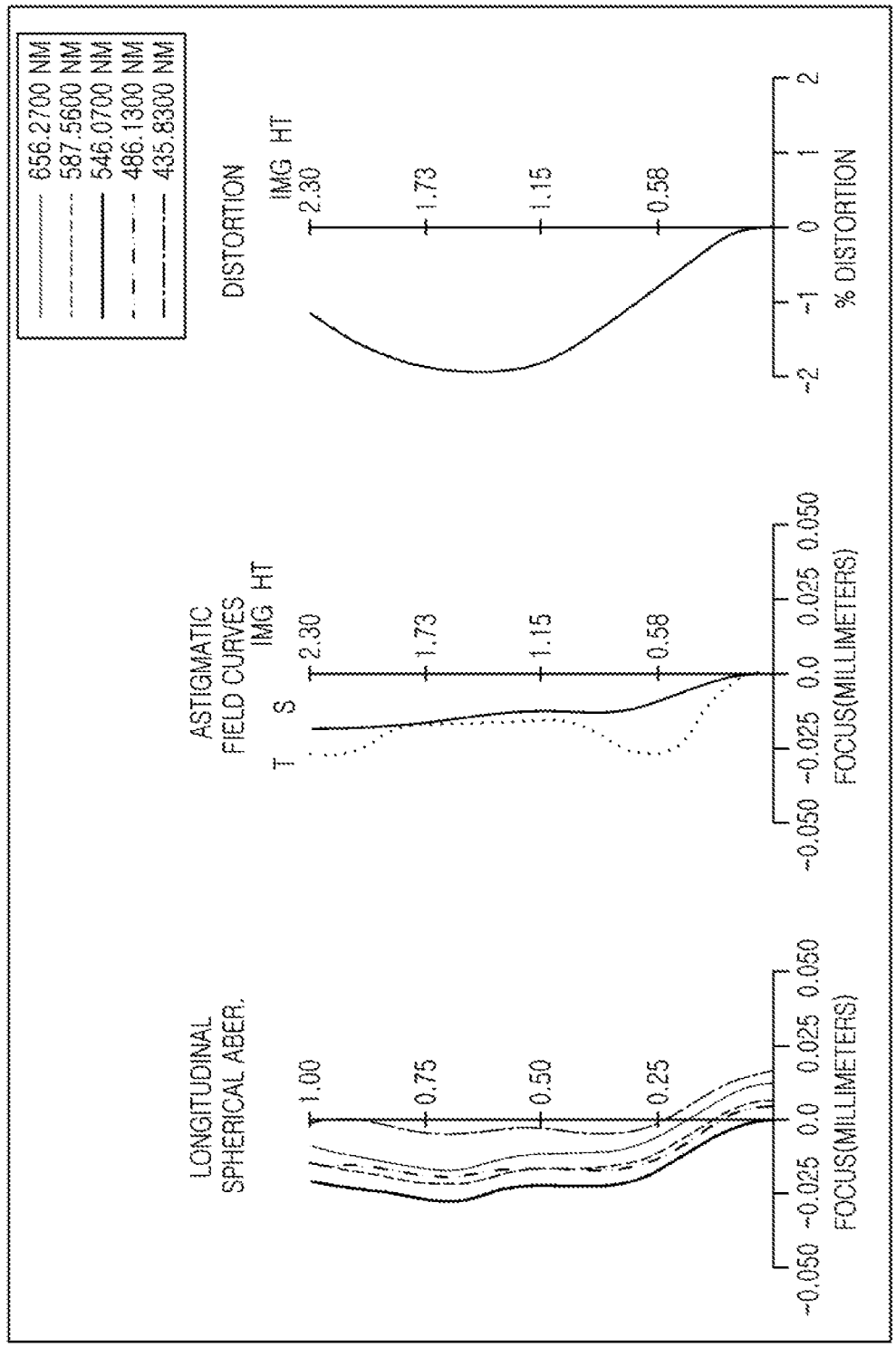
FIG. 2 is diagram illustrating examples of graphs having curves representing aberration characteristics of the optical device illustrated in FIG. 1.
Figure 5:
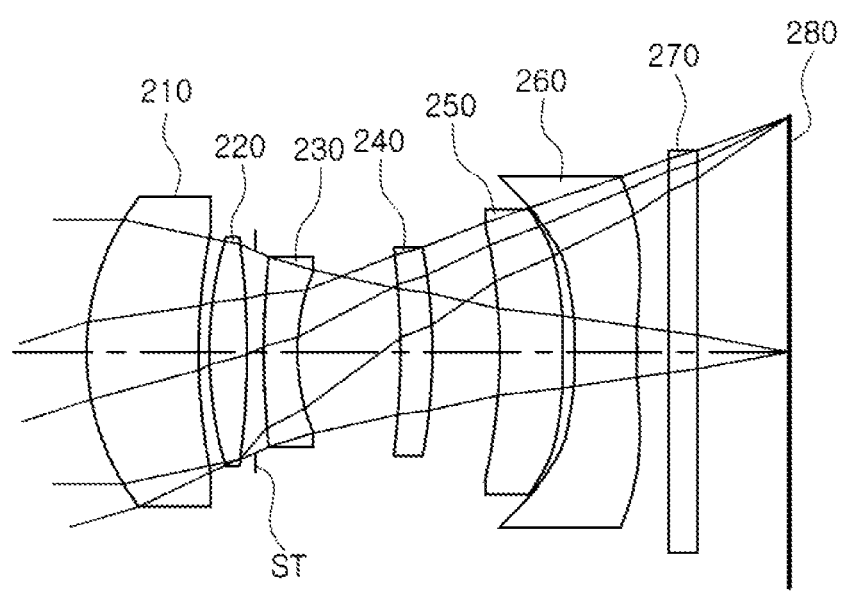
FIG. 5 is a diagram illustrating an example of an optical device.
Figure 6:
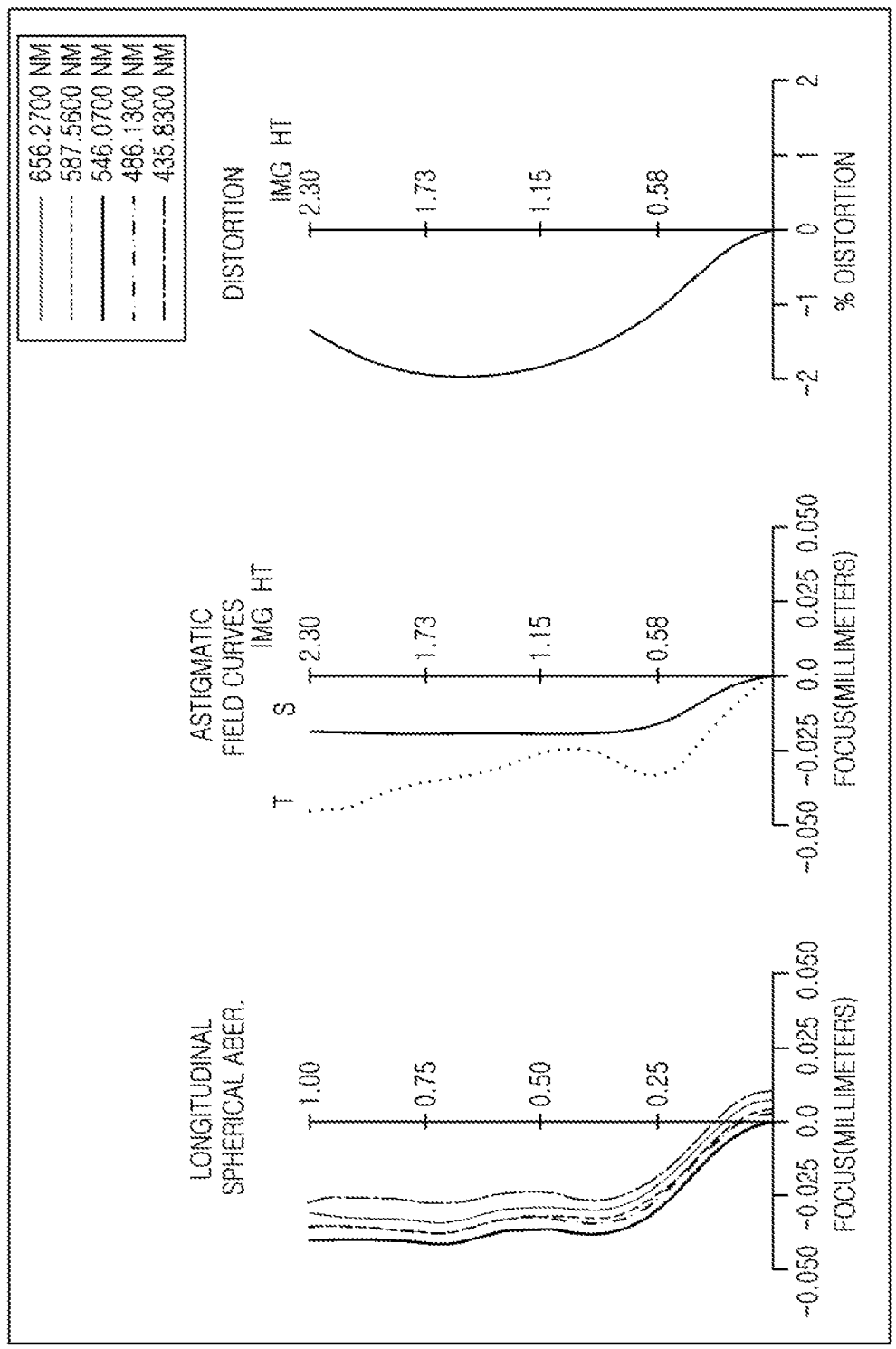
FIG. 6 is diagram illustrating examples of graphs having curves representing aberration characteristics of the optical system illustrated in FIG. 5.
Figure 9:
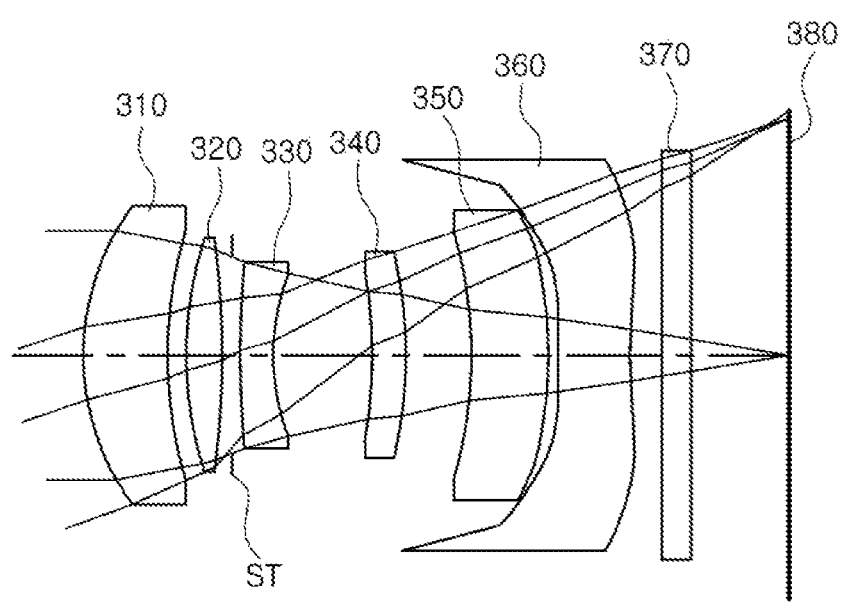
FIG. 9 is a diagram illustrating an example of an optical device.
Figure 10:
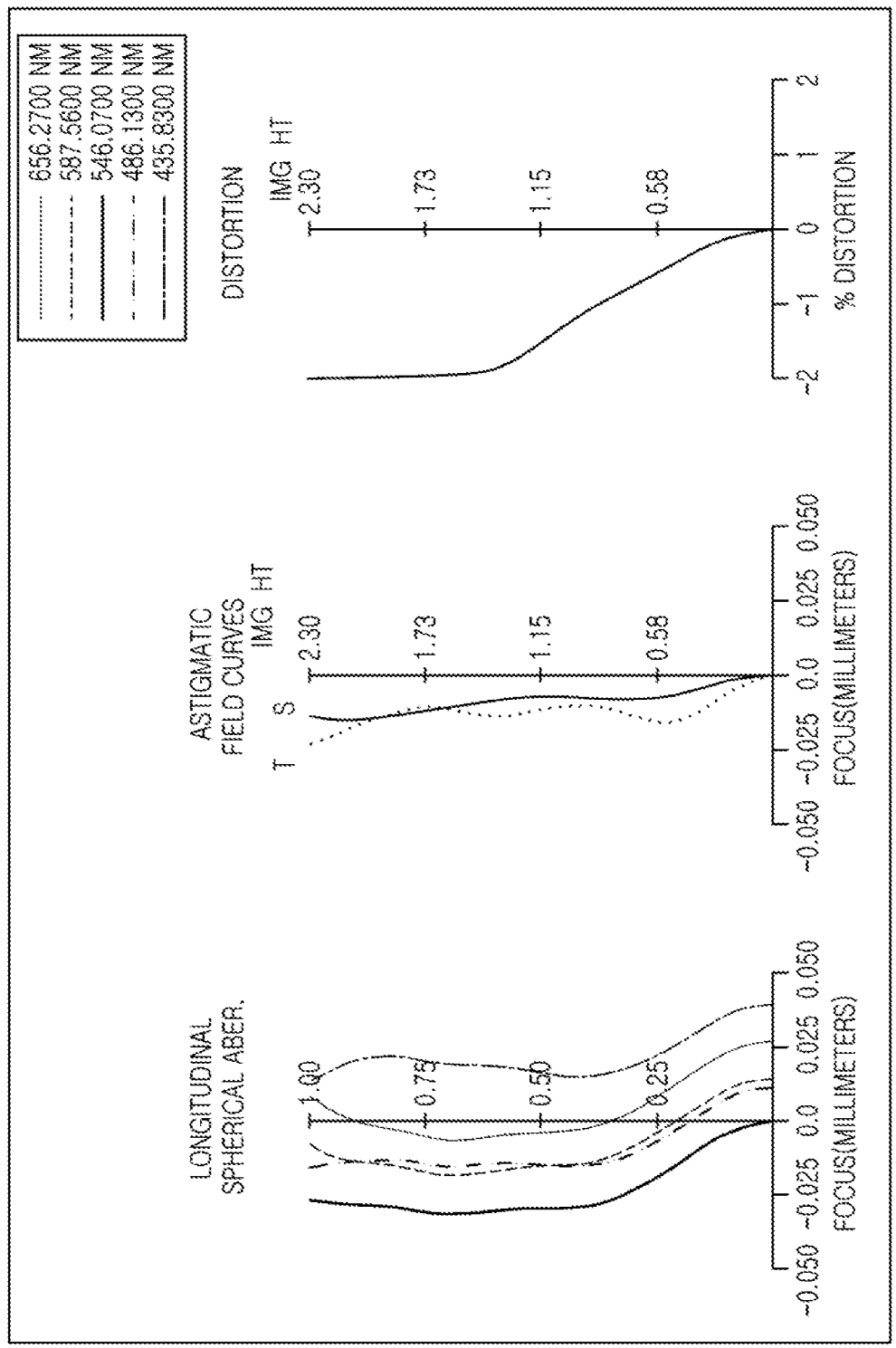
FIG. 10 is a diagram illustrating examples of graphs having curves representing aberration characteristics of the optical system illustrated in FIG. 9.

As shown in FIG. 2, the optical device according to the second example may include a first lens 210, a second lens 220, a third lens 230, a fourth lens 240, a fifth lens 250, and a sixth lens 260. The optical device may further include a stop ST, an infrared cut-off filter 270, and an image sensor 280.

As illustrated in Table 2 below, a focal length (f1) of the first lens 210 may be 6.7 mm, a focal length (f2) of the second lens 220 may be 4.85 mm, a focal length (f3) of the third lens 230 may be −3.79 mm, a focal length (f4) of the fourth lens 240 may be 22.36 mm, a focal length (f5) of the fifth lens 250 may be −83.08 mm, a focal length (f6) of the sixth lens 260 may be −7.38 mm, and an overall focal length (f) of the optical device may be 7.5 mm.

TABLE 2

| | |
|---|---|
| f | 7.5 |
| f1 | 6.7 |
| f2 | 4.85 |
| f3 | −3.79 |
| f4 | 22.36 |
| f5 | −83.08 |
| f6 | −7.38 |
| FNO | 2.8 |
| TTL | 5.8 |
| FOV | 17 |
| r1/f | 0.299763 |

The characteristics (radii of curvature, thicknesses, refractive indices, and Abbe numbers) of the respective lenses are illustrated in FIG. 7.

In the second example, the first lens 210 may have positive refractive power, and may have a meniscus shape of which an object-side surface is convex. For example, a first surface of the first lens 210 may be convex in the paraxial region, and a second surface of the first lens 210 may be concave in the paraxial region.

The second lens 220 may have positive refractive power, and both surfaces of the second lens 220 may be convex. For example, first and second surfaces of the second lens 220 may be convex in the paraxial region.

The third lens 230 may have negative refractive power, and may have a meniscus shape of which an object-side surface is convex. For example, a first surface of the third lens 230 may be convex in the paraxial region, and a second surface of the third lens 230 may be concave in the paraxial region.

The fourth lens 240 may have positive refractive power, and may have a meniscus shape of which an image-side surface is convex. For example, a first surface of the fourth lens 240 may be concave in the paraxial region, and a second surface of the fourth lens 240 may be convex in the paraxial region.

The fifth lens 250 may have negative refractive power, and may have a meniscus shape of which an image-side surface is convex. For example, a first surface of the fifth lens 250 may be concave in the paraxial region, and a second surface of the fifth lens 250 may be convex in the paraxial region.

The sixth lens 260 may have negative refractive power, and may have a meniscus shape of which an object-side surface is convex. For example, a first surface of the sixth lens 260 may be convex in the paraxial region, and a second surface of the sixth lens 260 may be concave in the paraxial region.

In addition, the sixth lens 260 may have at least one inflection point formed on at least one of the first and second surfaces of the sixth lens 260.

The respective surfaces of the first to sixth lenses 210 to 260 may have aspherical coefficients as illustrated in FIG. 8.

The stop ST may be disposed between the second lens 220 and the third lens 230. The optical device configured as described above may have aberration characteristics illustrated in FIG. 6.

An optical device according to a third example will be described with reference to FIGS. 9 through 12.

The optical device according to the third example may include a first lens 310, a second lens 320, a third lens 330, a fourth lens 340, a fifth lens 350, and a sixth lens 360. The optical device according to the third example may further include a stop ST, an infrared cut-off filter 370, and an image sensor 380.

As illustrated in Table 3, a focal length (f1) of the first lens 310 may be 7.34 mm, a focal length (f2) of the second lens 320 may be 4.65 mm, a focal length (f3) of the third lens 330 may be −4.08 mm, a focal length (f4) of the fourth lens 340 may be 18.35 mm, a focal length (f5) of the fifth lens 350 may be −245 mm, a focal length (f6) of the sixth lens 360 may be −7.11 mm, and an overall focal length (f) of the optical device may be 7.5 mm.

TABLE 3

| | |
|---|---|
| f | 7.5 |
| f1 | 7.34 |
| f2 | 4.65 |
| f3 | −4.08 |
| f4 | 18.35 |
| f5 | −245 |
| f6 | −7.11 |
| FNO | 2.8 |
| TTL | 6 |
| FOV | 18 |
| r1/f | 0.294819 |

The characteristics (radii of curvature, thicknesses, refractive indices, and Abbe numbers) of the respective lenses are illustrated in FIG. 11.

In the third example, the first lens 310 may have positive refractive power, and may have a meniscus shape of which an object-side surface is convex. For example, a first surface of the first lens 310 may be convex in the paraxial region, and a second surface of the first lens 310 may be concave in the paraxial region.

The second lens 320 may have positive refractive power, and both surfaces thereof may be convex. For example, first and second surfaces of the second lens 320 may be convex in the paraxial region.

The third lens 330 may have negative refractive power, and may have a meniscus shape of which an object-side surface is convex. For example, a first surface of the third lens 330 may be convex in the paraxial region, and a second surface of the third lens 330 may be concave in the paraxial region.

The fourth lens 340 may have positive refractive power, and may have a meniscus shape of which an image-side surface is convex. For example, a first surface of the fourth lens 340 may be concave in the paraxial region, and a second surface of the fourth lens 340 may be convex in the paraxial region.

The fifth lens 350 may have negative refractive power, and may have a meniscus shape of which an image-side surface is convex. For example, a first surface of the fifth lens 350 may be concave in the paraxial region, and a second surface of the fifth lens 350 may be convex in the paraxial region.

The sixth lens 360 may have negative refractive power, and may have a meniscus shape of which an object-side surface is convex. For example, a first surface of the sixth lens 360 may be convex in the paraxial region, and a second surface of the sixth lens 360 may be concave in the paraxial region.

In addition, the sixth lens 360 may have at least one inflection point formed on at least one of the first and second surfaces thereof.

The surfaces of the first to sixth lenses 310 to 360 may have aspherical coefficients as illustrated in FIG. 12. The stop ST may be disposed between the second lens 320 and the third lens 330. The optical device configured as described above may have aberration characteristics illustrated in FIG. 10.

Figure 13:
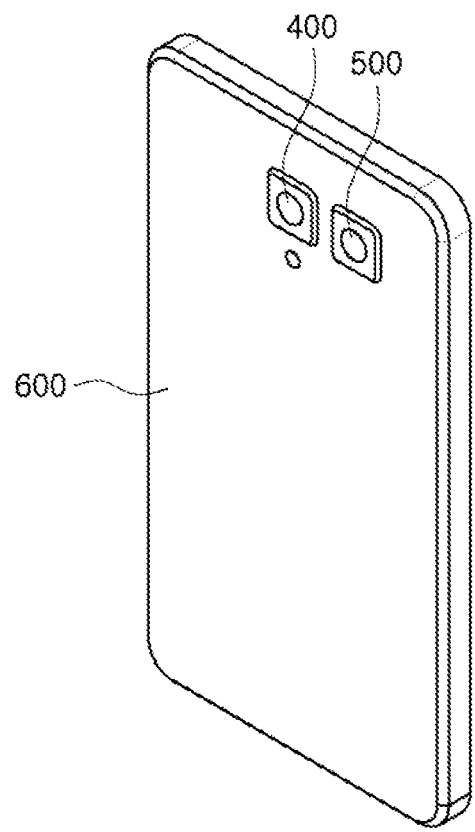
FIG. 13 is a diagram illustrating an example of a mobile device.

FIG. 13 is a diagram illustrating an example of a mobile device according to an example.

Referring to FIG. 13, the mobile device 600 according to the example may include a plurality of optical devices having different fields of view.

For example, the mobile device 600 according to the example may include a first optical device 400 having a relatively narrow field of view and a second optical device 500 having a relatively wide field of view.

The first optical device 400 may be the optical device according to the first to third example described above.

Therefore, a field of view (FOV1) of the first optical device 400 may be greater than 15 degrees and less than 35 degrees.

A difference between the field of view (FOV1) of the first optical device 400 and a field of view (FOV2) of the second optical device 500 may be 20 degrees or more.

In an example, the difference between the field of view (FOV1) of the first optical device 400 and the field of view (FOV2) of the second optical device 500 may be 20 degrees or more and 60 degrees or less.

As described above, where the first optical device 400 and the second optical device 500 are included together, a subject positioned at a distance comparatively far from the mobile device 600 may be clearly photographed (that is, a telephoto function) using the first optical device 400, and a wide background may be photographed (that is, a wide angle function) using the second optical device 500, if desired.

In addition, when a subject is photographed, the first optical device 400 and the second optical device 500 may be driven together with each other to simultaneously photograph two images, and thus images having different characteristics may be simultaneously photographed, and an operation of synthesizing these images, may be performed, if desired.

As set forth above, in the optical device according to examples, an aberration improvement effect may be increased, and brightness and high levels of resolution may be realized.

In the mobile device according to an example, the plurality of optical devices having different fields of view are mounted, whereby the wide angle function and the telephoto function may be realized at the same time.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical device comprising:
   first to sixth lenses disposed sequentially from an object; and
   an image sensor configured to convert an image of a subject incident through the first to sixth lenses into an electrical signal,
   wherein $0.7 < TTL/f < 1.0$, where TTL is a distance from an object-side surface of the first lens to an imaging plane of the image sensor, and f is an overall focal length of the optical device, and
   wherein $v1-v3 > 30$, where v1 is an Abbe number of the first lens, and v3 is and Abbe number of the third lens.

2. The optical device of claim 1, wherein $1.1 < TTL/(ImgH*2)$, where ImgH is half of a diagonal length of the imaging plane of the image sensor.

3. The optical device of claim 1, wherein $15° < FOV < 35°$, where FOV is a field of view of the optical device.

4. The optical device of claim 1, wherein $0.16 < r1/f < 2$, where r1 is a radius of curvature of the object-side surface of the first lens.

5. The optical device of claim 1, wherein $v4 < 30$, where v4 is an Abbe number of the fourth lens is v4.

6. The optical device of claim 1, further comprising a stop disposed between the second lens and the third lens.

7. The optical device of claim 6, wherein $f/SD \leq 2.8$, where SD is a diameter of the stop.

8. The optical device of claim 1, wherein an image-side surface of the first lens is concave.

9. The optical device of claim 1, wherein an image-side surface of the third lens is concave.

10. The optical device of claim 1, wherein an image-side surface of the sixth lens is concave.

11. The optical device of claim 1, wherein at least one of an object-side surface and an image-side surface of the sixth lens has at least one inflection point.

12. The optical device of claim 1, wherein at least one of an object-side surface and an image-side surface of each of the first to sixth lenses is aspherical.

13. The optical device of claim 1, wherein an image-side surface and an object-side surface of the second lens is convex.

14. The optical device of claim 1, wherein an image-side surface and an object-side surface of the fourth lens is concave.

15. A mobile device comprising:
a plurality of optical devices having different fields of view;
wherein a difference between fields of view of two optical devices of the plurality of optical devices is 20 degrees or more, and one optical device of the plurality of optical devices comprises:
first to sixth lenses disposed sequentially from an object; and
an image sensor configured to convert an image of a subject incident through the first to sixth lenses into an electrical signal,
wherein $0.7<TTL/f<1.0$, where TTL is a distance from an object-side surface of the first lens to an imaging plane of the image sensor, and f is an overall focal length of the optical device, and
wherein $v1-v3<30$, where v1 is an Abbe number of the first lens, and v3 is and Abbe number of the third lens.

16. The mobile device of claim 15, wherein the plurality of optical devices comprise a first optical device and a second optical device, and $15°<FOV1<35°$, where FOV1 is a field of view of the first optical device.

17. The mobile device of claim 16, wherein $20°≤|FOV1-FOV2|≤60°$, where FOV2 is a field of view of the second optical device.

* * * * *